United States Patent
Jeong et al.

(10) Patent No.: US 8,421,672 B2
(45) Date of Patent: Apr. 16, 2013

(54) APPARATUS AND METHOD FOR PSEUDO RANGE VERIFICATION OF GLOBAL NAVIGATION SATELLITE SYSTEM (GNSS) RECEIVER

(75) Inventors: Seong-Kyun Jeong, Suwon-si (KR); Tae Hee Kim, Daejeon (KR); Sang Uk Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 199 days.

(21) Appl. No.: 12/945,315

(22) Filed: Nov. 12, 2010

(65) Prior Publication Data

US 2011/0279309 A1 Nov. 17, 2011

(30) Foreign Application Priority Data

May 14, 2010 (KR) ........................ 10-2010-0045503

(51) Int. Cl.
*G01S 19/20* (2010.01)
*G01S 19/03* (2010.01)

(52) U.S. Cl.
USPC .................................. 342/357.58; 342/357.4

(58) Field of Classification Search ............. 342/357.24, 342/357.25, 357.4, 357.58; 701/468, 470
See application file for complete search history.

(56) References Cited

U.S. PATENT DOCUMENTS

| 5,525,999 | A  | * | 6/1996 | King et al. ............... 342/357.62 |
| 2006/0195262 | A1 |   | 8/2006 | Draganov |
| 2008/0091350 | A1 | * | 4/2008 | Smith et al. ................... 701/213 |

FOREIGN PATENT DOCUMENTS

| KR | 100265465 B1 | 6/2000 |
| KR | 2002-0087529 A | 11/2002 |
| KR | 2008-0026865 A | 3/2008 |

* cited by examiner

*Primary Examiner* — Dao Phan
(74) *Attorney, Agent, or Firm* — Rabin & Berdo, P.C.

(57) ABSTRACT

Provided is a method and apparatus for a pseudo range verification of a global navigation satellite system (GNSS) receiver, more particularly, a method and apparatus for the pseudo range verification of the GNSS receiver by comparing the pseudo range for a measurement calculated in the GNSS receiver and the pseudo range for a verification generated depending on a position of the GNSS receiver.

16 Claims, 4 Drawing Sheets

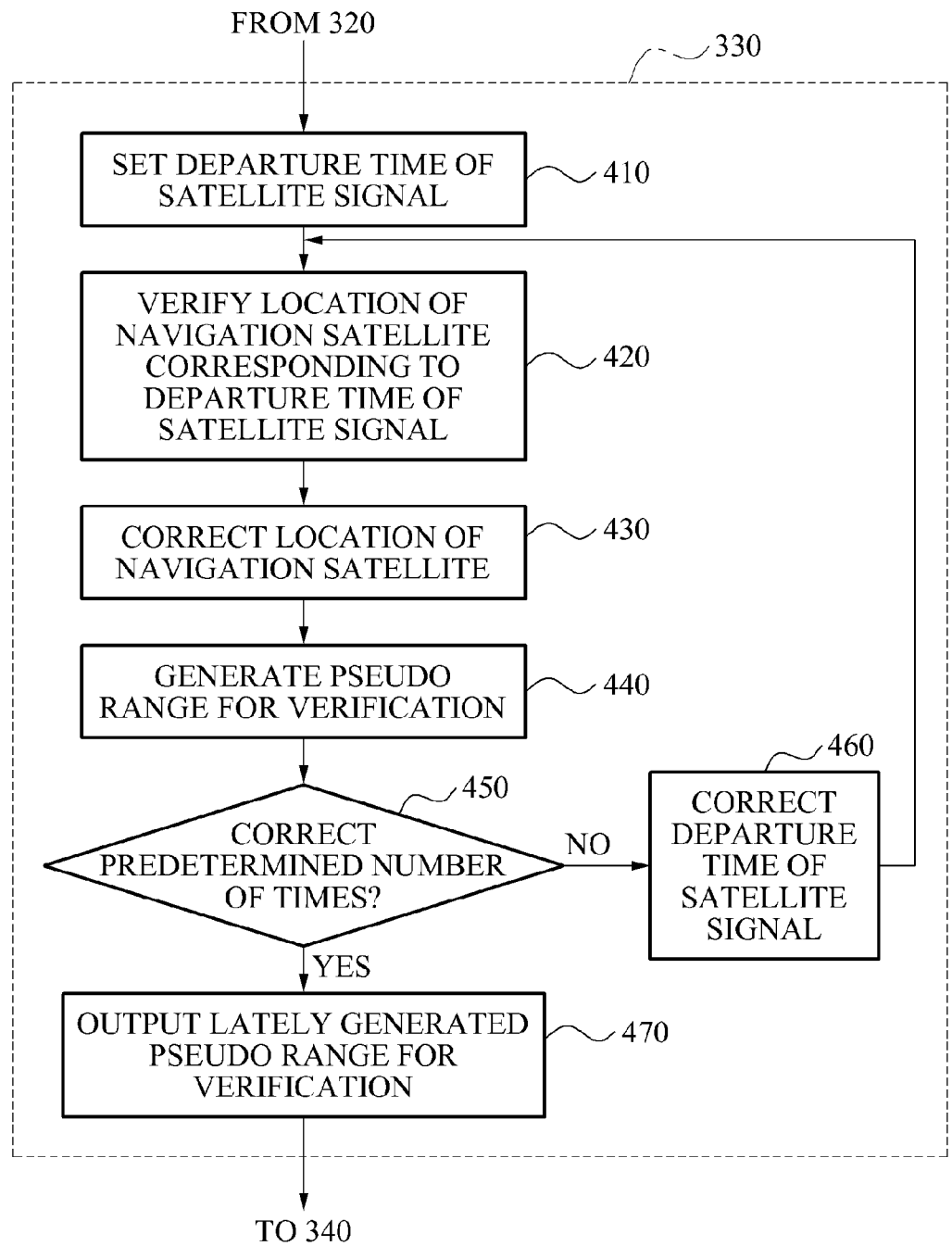

APPARATUS AND METHOD FOR PSEUDO RANGE VERIFICATION OF GLOBAL NAVIGATION SATELLITE SYSTEM (GNSS) RECEIVER

CROSS-REFERENCE TO RELATED APPLICATION

This application claims the benefit of Korean Patent Application No. 10-2010-0045503, filed on May 14, 2010, in the Korean Intellectual Property Office, the disclosure of which is incorporated herein by reference.

BACKGROUND

1. Field of the Invention

The present invention relates to an apparatus for analyzing a pseudo range for a measurement calculated in a global navigation satellite system (GNSS) receiver to verify a measurement performance for the pseudo range of the GNSS receiver.

2. Description of the Related Art

A satellite navigation system is a system for calculating a location of a global navigation satellite system (GNSS) receiver based on a pseudo range and a location of a navigation satellite. Here, the pseudo range is a distance between the GNSS receiver and the navigation satellite and measured in the GNSS receiver. However, when the pseudo range between the GNSS receiver and the navigation satellite is erroneously measured, an error may occur in the location of the GNSS receiver. Accordingly, verifying a measurement performance for the pseudo range of the GNSS receiver may be important to measuring a performance of the GNSS receiver.

In a conventional technology, when verifying the performance of the GNSS receiver, the performance of the GNSS receiver is calculated by measuring a location accuracy with the GNSS receiver as a reference position, instead of directly verifying the pseudo range. When a position of the GNSS receiver is calculated, the pseudo range between the GNSS receiver and the navigation satellite measured in the GNSS receiver is used. However, since a measurement value of the pseudo range varies depending on a characteristic of the GNSS receiver, a verification of the pseudo range is essential for a basic performance measurement of the GNSS receiver. The verification of the pseudo range is necessary for a satellite navigation simulator, and the like which generates a navigation signal and is used for a verification.

SUMMARY

An aspect of the present invention provides an apparatus and method for a pseudo range verification of a GNSS receiver.

An aspect of the present invention provides an apparatus and method for a pseudo range verification of a GNSS receiver that may compare a pseudo range for a measurement calculated in the GNSS receiver and a pseudo range for a verification generated depending on a position of the GNSS receiver, and thereby verify a pseudo range of the GNSS receiver.

According to an aspect of the present invention, there is provided an apparatus for a pseudo range verification including a navigation data receiver to receive, from a GNSS receiver, a pseudo range for a measurement measured in the GNSS receiver, a satellite location calculator to calculate a location of a navigation satellite, a receiver location input unit to receive an input on a location of the GNSS receiver, a pseudo range generator to generate a pseudo range for a verification using the location of the GNSS receiver and the location of the navigation satellite, and a pseudo range verification unit to verify whether an error exists in the pseudo range for the measurement by comparing a difference between the pseudo range for the measurement and the pseudo range for the verification.

According to another aspect of the present invention, there is provide a method for a pseudo range verification including receiving navigation data from a GNSS receiver, calculating a location of a navigation satellite based on the navigation data, and generating a pseudo range for a verification based on the location of the navigation satellite and an input location of the GNSS receiver, and verifying whether an error exists in a pseudo range for a measurement by comparing a difference between the pseudo range for the measurement included in the navigation data and the pseudo range for the verification.

According to embodiments of the present invention, there is provided an apparatus and method for a pseudo range verification of a GNSS receiver that may be used for an accurate performance analysis of the GNSS receiver. An error occurring in a process of measuring the pseudo range may be analyzed by analyzing an accuracy of the pseudo range and a measurement distribution of the pseudo range. Accordingly, the present invention may be used not only for an actual GNSS receiver but also for a receiver module of a satellite navigation simulator for the pseudo range verification. Also, a similar algorithm may be applied to generating the pseudo range of a simulator.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 4 is a flowchart illustrating a process of generating a pseudo range for a verification according to an embodiment of the present invention for the system of FIG. 3.

DETAILED DESCRIPTION

Figure 1:
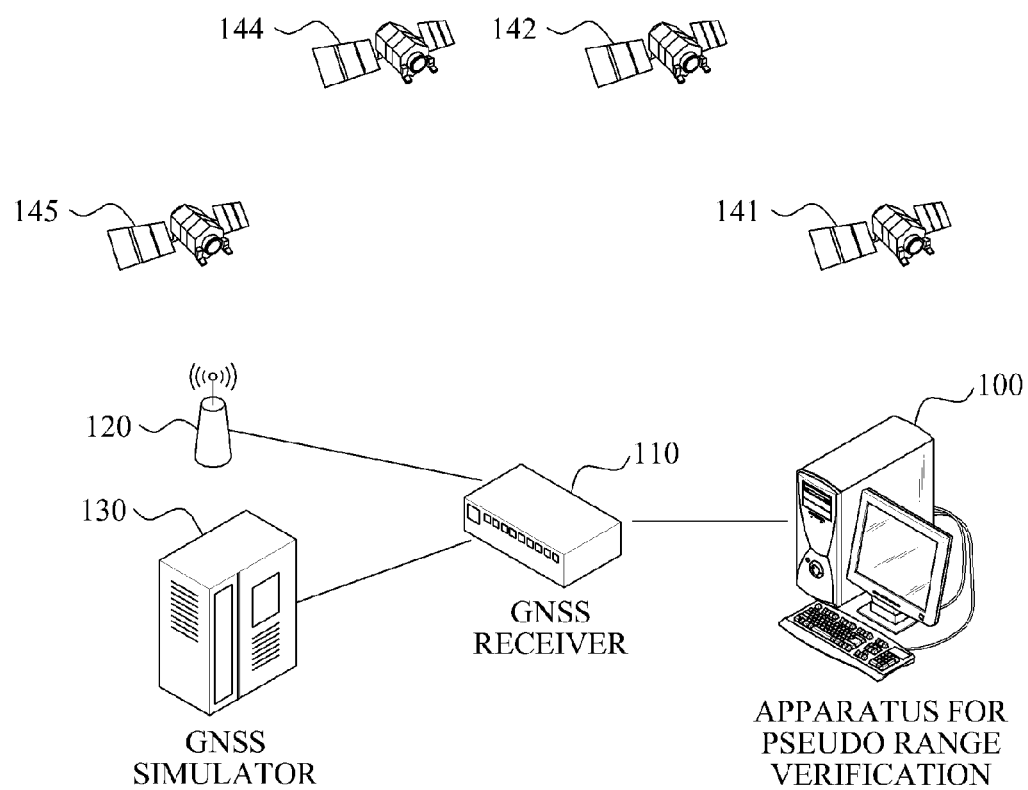
FIG. 1 is a diagram illustrating a structure of a system for a pseudo range verification of a global navigation satellite system (GNSS) receiver according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

According to an aspect of the present invention, an apparatus and device for a pseudo range verification of a global navigation satellite system (GNSS) receiver by comparing the pseudo range for a measurement calculated in the GNSS receiver and the pseudo range for a verification generated depending on a position of the GNSS receiver is provided.

FIG. 1 is a diagram illustrating a structure of a system for a pseudo range verification of a GNSS receiver according to an embodiment of the present invention.

According to FIG. 1, the system for the pseudo range verification may include an apparatus 100 for a pseudo range verification, a GNSS receiver 110, a receive antenna 120, a GNSS simulator 130, and navigation satellites 141, 142, 144, and 145.

The apparatus 100 for a pseudo range verification may verify the pseudo range for a measurement included in navigation data which is received from the GNSS receiver 110, and determine whether an abnormality exists in the GNSS receiver 110.

The GNSS receiver 110 may receive a satellite signal which is directly transmitted from the navigation satellites 141, 142, 144, and 145 via the receive antenna 120, and may receive the satellite signal which is generated in the GNSS simulator 130.

Figure 2:
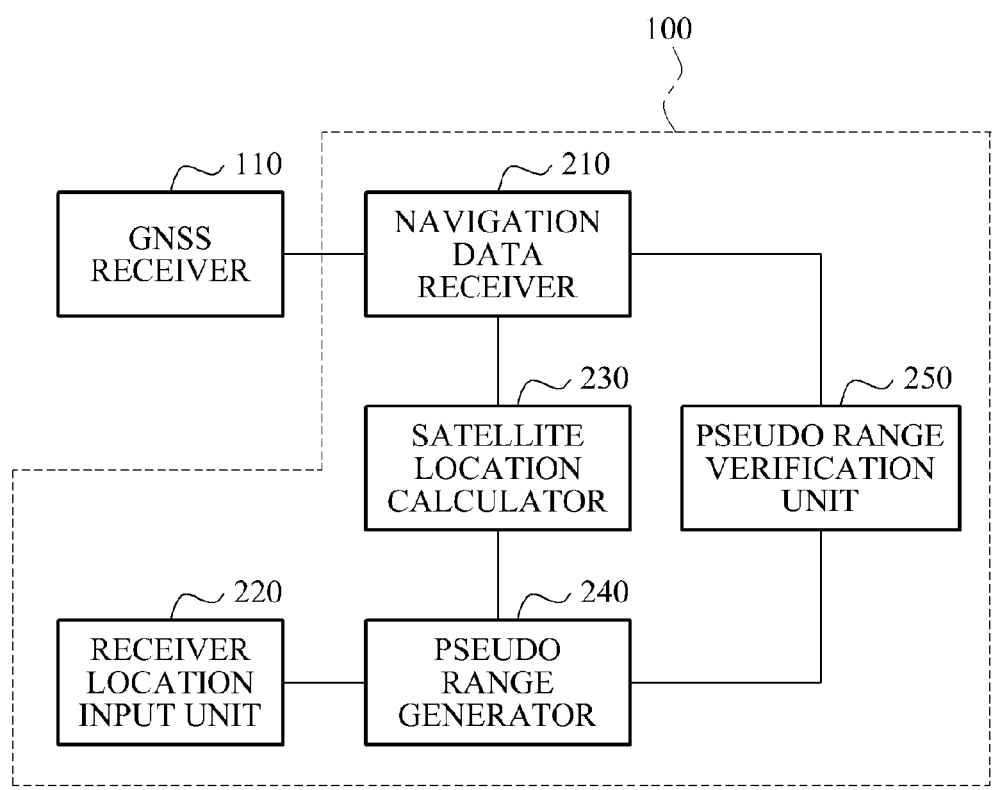
FIG. 2 is a diagram illustrating a configuration of an apparatus for a pseudo range verification according to an embodiment of the present invention.

FIG. 2 is a diagram illustrating a configuration of an apparatus for a pseudo range verification according to an embodiment of the present invention.

Referring to FIG. 2, the apparatus 100 for a pseudo range verification may include a navigation data receiver 210, a receiver location input unit 220, a satellite location calculator 230, a pseudo range generator 240, and a pseudo range verification unit 250.

The navigation data receiver 210 may receive navigation data from a GNSS receiver 110. The navigation data may include a pseudo range for a measurement measured in the GNSS receiver 110, data of a satellite signal, and time information associated with a point in time at which the satellite signal is received. Here, the pseudo range for the measurement is a pseudo range between the GNSS receiver 110 and the navigation satellite which transmits the satellite signal.

The receiver location input unit 220 may receive an input on a location of the GNSS receiver 110 when estimating the pseudo range for the measurement.

The satellite location calculator 230 may calculate the location of the navigation satellite transmitting the satellite signal, based on the data of the satellite signal and the time information associated with a point in time at which the satellite signal is received. The satellite location calculator 230 may verify the navigation satellite transmitting the satellite signal based on the data of the satellite signal, verify an orbit of the navigation satellite corresponding to the navigation satellite, estimate a departure time of the satellite signal based on the time information associated with a point in time at which the satellite signal is received, and verify the location of the navigation satellite corresponding to the departure time of the satellite signal that is estimated in the orbit of the navigation satellite. Here, the departure time of the satellite signal may be a point in time at which the satellite signal is received, and may be a point in time prior to a time that is predetermined based on the point in time at which the satellite signal is received.

By reflecting the rotation of the earth into the calculated location, the satellite location calculator 230 may correct the location of the navigation satellite as shown in Equation 1.

$$\begin{bmatrix} X' \\ Y' \\ Z' \end{bmatrix} = \begin{bmatrix} \cos\phi & \sin\phi & 0 \\ -\sin\phi & \cos\phi & 0 \\ 0 & 0 & 1 \end{bmatrix} \begin{bmatrix} X \\ Y \\ Z \end{bmatrix}$$ [Equation 1]

In Equation 1, (X, Y, Z) denotes a coordinate of a satellite before reflecting the rotation of the earth, (X', Y', Z') denotes a coordinate of the satellite after reflecting the rotation of the earth, and $\phi$ denotes a rotation angle of the earth during a transmission time.

The pseudo range generator 240 may generate a pseudo range for a verification using the received input on the location of the GNSS receiver 110 and the calculated location of the navigation satellite. The pseudo range for the verification may be generated by Equation 2.

$$\rho = \sqrt{(x_s - x_u)^2 + (y_s - y_u)^2 + (z_s - z_u)^2}$$ [Equation 2]

In Equation 2, $(x_s, y_s, z_s)$ denotes a coordinate of a satellite, $(x_u, y_u, z_u)$ denotes a coordinate of a receiver, and $\rho$ denotes a pseudo range for a verification.

The satellite location calculator 230 may correct the departure time of the satellite signal using the pseudo range for the verification generated by the pseudo range generator 240, and may re-verify the location of the navigation satellite based on the corrected departure time of the satellite signal to correct the calculated location of the navigation satellite. Here, the departure time of the satellite signal may be corrected by Equation 3.

$$t = t_a - \rho/C$$ [Equation 3]

In Equation 3, t denotes a departure time of a signal, $t_a$ denotes a measurement time of a receiver, $\rho$ denotes a pseudo range, and C denotes the velocity of light.

When the satellite location calculator 230 corrects the location of the navigation satellite, the pseudo range generator 240 may correct the pseudo range for the verification by recalculating a pseudo range between the GNSS receiver 110 and the navigation satellite using the corrected location of the navigation satellite.

The satellite location calculator 230 may repeatedly correct the calculated location of the navigation satellite a predetermined number of times, and the pseudo range generator 240 may repeatedly correct the pseudo range for the verification a predetermined number of times.

The pseudo range verification unit 250 may calculate a difference value between the pseudo range for the measurement and the pseudo range for the verification, and may determine that the GNSS receiver 110 is functioning normally when the difference value is less than a predetermined threshold value, and determines that an abnormality exists in the GNSS receiver 110 when the difference value is greater than or equal to the predetermined threshold value.

Hereinafter, a method for verifying a pseudo range in the GNSS receiver configured as above according to the present invention is described referring to FIGS.

Figure 3:
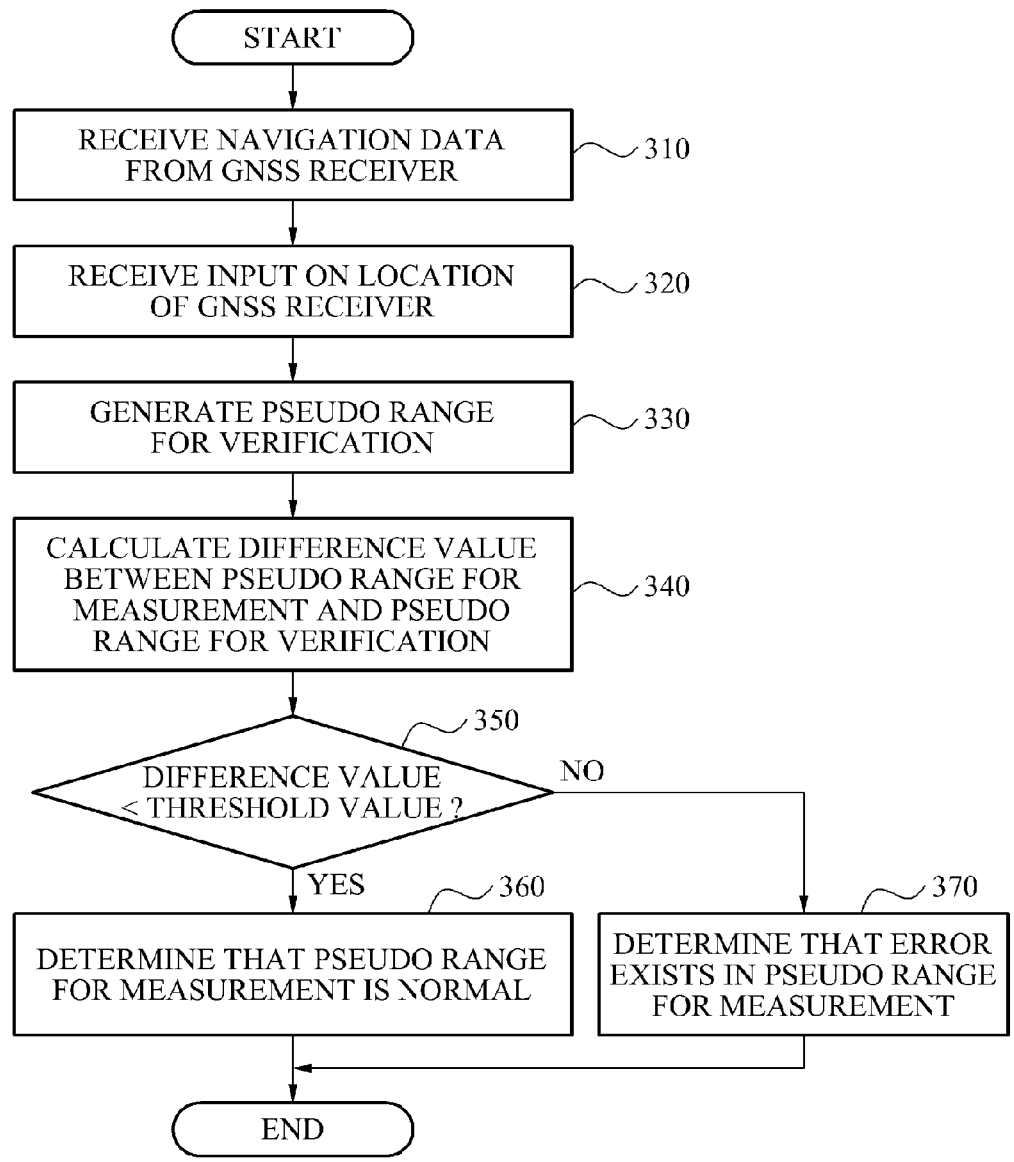
FIG. 3 is a flowchart illustrating a process of verifying a pseudo range according to an embodiment of the present invention.

FIG. 3 is a flowchart illustrating a process of verifying a pseudo range according to an embodiment of the present invention.

Referring to FIG. 3, in operation 310, the apparatus 100 for a pseudo range verification of FIG. 1 may receive navigation data from a GNSS receiver 110 of FIG. 1. Here, the navigation data may include a pseudo range for a measurement measured in the GNSS receiver 110, data of a satellite signal, and time information associated with a point in time at which the satellite signal is received. Here, the pseudo range for the measurement is a pseudo range between the GNSS receiver 110 and the navigation satellite which transmits the satellite signal.

In operation 320, the apparatus 100 for the pseudo range verification may receive an input on a location of the GNSS receiver 110 when estimating the pseudo range for the measurement.

In operation 330, the apparatus 100 for the pseudo range verification may calculate a location of the navigation satellite based on the data of the satellite signal and time information associated with a point in time at which the satellite signal is received, and may generate a pseudo range for a verification based on the input location of the GNSS receiver 110 and the calculated location of the navigation satellite. Here, the apparatus 100 for the pseudo range verification may verify the navigation satellite transmitting the satellite signal based on the data of the satellite signal, verify an orbit of the navigation satellite corresponding to the navigation satellite, estimate a departure time of the satellite signal based on the time information associated with a point in time at which the satellite signal is received, and verify the location of the navigation satellite corresponding to the departure time of the satellite signal that is estimated in the orbit of the navigation satellite. The pseudo range for the verification generated in operation 330 may not be accurate since an accurate departure time of the satellite signal may not be verified. Therefore, the departure time of the satellite signal may be corrected, and the pseudo range for the verification may be corrected based on the corrected the departure time of the satellite signal. A method for correcting the corrected pseudo range for the verification is described hereinafter referring to FIG. 4.

In operation 340, the apparatus 100 for the pseudo range verification may calculate a difference value between the pseudo range for the measurement and the pseudo range for the verification, and verify whether the difference value is less than a predetermined threshold value.

When the difference value is less than the predetermined threshold value as a result of operation 350, the apparatus 100 for the pseudo range verification may determine that the GNSS receiver 110 is functioning normally in operation 360.

When the difference value is greater than or equal the predetermined threshold value as a result of operation 350, the apparatus 100 for the pseudo range verification may determine that an abnormality exists in the GNSS receiver 110 in operation 370.

FIG. 4 is a flowchart illustrating operation S330 of FIG. 3 in further detail.

Referring to FIG. 4, in operation 410, the apparatus 100 for the pseudo range verification may set a departure time of a satellite signal based on time information associated with a point in time at which the satellite signal is received. Here, the departure time of the satellite signal may be a point in time at which the satellite signal is received, and may be a point in time prior to a time that is predetermined based on the point in time at which the satellite signal is received.

In operation 420, the apparatus 100 for the pseudo range verification may verify a location of the navigation satellite corresponding to the departure time of the satellite signal in an orbit of the navigation satellite.

In operation 430, the apparatus 100 for the pseudo range verification may correct the location of the navigation satellite reflecting the rotation of the earth.

In operation 440, the apparatus 100 for the pseudo range verification may generate a pseudo range for a verification using the location of the navigation satellite corrected in operation 430 and a location of a GNSS receiver 110.

In operation 450, the apparatus 100 for the pseudo range verification may verify whether the location of the navigation satellite is corrected a predetermined number of times.

When the location of the navigation satellite is not corrected the predetermined number of times as a result of operation 450, the apparatus 100 for the pseudo range verification may correct the departure time of the satellite signal using the generated pseudo range in operation 460, and then go to operation 420 and thereby repeat a series of operation from operation 420 through 450.

Conversely, when the location of the navigation satellite is corrected the predetermined number of times as a result of operation 450, the apparatus 100 for the pseudo range verification may output the lately generated pseudo range for the verification as the correction-completed pseudo range for the verification in operation 470.

The above-described exemplary embodiments of the present invention may be recorded in computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for a pseudo range verification, the apparatus comprising:
   a navigation data receiver to receive, from a global navigation satellite system (GNSS) receiver, a pseudo range for a measurement measured in the GNSS receiver;
   a satellite location calculator to calculate a location of a navigation satellite;
   a receiver location input unit to receive an input on a location of the GNSS receiver;
   a pseudo range generator to generate a pseudo range for a verification using the location of the GNSS receiver and the location of the navigation satellite; and
   a pseudo range verification unit to verify whether an error exists in the pseudo range for the measurement by comparing the pseudo range for the measurement to the pseudo range for the verification.

2. The apparatus of claim 1, wherein,
   the navigation data receiver further receives data of a satellite signal, transmitted by the navigation satellite, used for the measurement and time information associated with a point in time at which the satellite signal is received, and
   the satellite location calculator calculates the location of the navigation satellite, based on the data of the satellite signal and the time information.

3. The apparatus of claim 2, wherein the satellite location calculator corrects the calculated location of the navigation satellite by reflecting a rotation of the earth into the calculated location.

4. The apparatus of claim 1, wherein the satellite location calculator corrects a departure time of the satellite signal using the pseudo range for the verification generated by the pseudo range generator, and re-verifies the location of the navigation satellite based on the corrected departure time of the satellite signal to correct the calculated location of the navigation satellite.

5. The apparatus of claim 4, wherein the satellite location calculator corrects the calculated location of the navigation satellite by reflecting a rotation of the earth into the calculated location when correcting the location of the navigation satellite.

6. The apparatus of claim 4, wherein the satellite location calculator repeatedly corrects the calculated location of the navigation satellite a predetermined number of times.

7. The apparatus of claim 3, wherein the pseudo range generator corrects the pseudo range for the verification by recalculating a pseudo range between the GNSS receiver and the navigation satellite using the corrected location of the navigation satellite.

8. The apparatus of claim 7, wherein the pseudo range generator repeatedly corrects the pseudo range for the verification a predetermined number of times.

9. The apparatus of claim 7, wherein:
the pseudo range verification unit calculates a difference value between the pseudo range for the measurement and the pseudo range for the verification, and
the pseudo range verification unit determines that the GNSS receiver is functioning normally when the difference value is less than a predetermined threshold value, and determines that an abnormality exists in the GNSS receiver when the difference value is greater than or equal to the predetermined threshold value.

10. A method for a pseudo range verification, the method comprising:
receiving navigation data from a GNSS receiver, the navigation data including a pseudo range for a measurement;
calculating a location of a navigation satellite based on the navigation data, and generating a pseudo range for a verification based on the location of the navigation satellite and an input location of the GNSS receiver; and
verifying whether an error exists in the pseudo range for the measurement by comparing the pseudo range for the measurement included in the navigation data and the pseudo range for the verification.

11. The method of claim 10, wherein the calculating comprises calculating the location of the navigation satellite, based on data of a satellite signal transmitted by the navigation satellite and included in the navigation data, and on time information associated with a point in time at which the satellite signal is received.

12. The method of claim 10, wherein the calculating comprises correcting the calculated location of the navigation satellite by reflecting the rotation of the earth into the calculated location.

13. The method of claim 10, further comprising:
calculating a departure time of a satellite signal used for a measurement of the pseudo range for the measurement, and correcting the pseudo range for the verification using the departure time of the satellite signal.

14. The method of claim 13, wherein the correcting comprises:
calculating the departure time of the satellite signal using the pseudo range for the verification;
re-verifying the location of the navigation satellite based on the departure time of the corrected satellite signal;
correcting the re-verified location of the navigation satellite by reflecting the rotation of the earth into the re-verified location of the navigation satellite; and
correcting the pseudo range for the verification by recalculating the pseudo range between the GNSS receiver and the navigation satellite using the corrected location of the navigation satellite.

15. The method of claim 13, wherein the correcting comprises repeatedly correcting a predetermined number of times.

16. The method of claim 10, wherein the verifying comprises:
calculating a difference value between the pseudo range for the measurement and the pseudo range for the verification, and
determining that the GNSS receiver is functioning normally when the difference value is less than a predetermined threshold value, and determining that an abnormality exists in the GNSS receiver when the difference value is greater than or equal to the predetermined threshold value.

* * * * *